(12) United States Patent
Neumann

(10) Patent No.: US 11,494,675 B2
(45) Date of Patent: Nov. 8, 2022

(54) METHOD AND SYSTEM FOR DATA CLASSIFICATION TO GENERATE A SECOND ALIMENTARY PROVIDER

(71) Applicant: KPN INNOVATIONS, LLC., Lakewood, CO (US)

(72) Inventor: Kenneth Neumann, Lakewood, CO (US)

(73) Assignee: KPN INNOVATIONS, LLC., Lakewood, CO (US)

( * ) Notice: Subject to any disclaimer, the term of this patent is extended or adjusted under 35 U.S.C. 154(b) by 0 days.

(21) Appl. No.: 16/983,065

(22) Filed: Aug. 3, 2020

(65) Prior Publication Data
US 2022/0036215 A1 Feb. 3, 2022

(51) Int. Cl.
*G06N 5/04* (2006.01)
*G06N 20/00* (2019.01)
*G06F 16/29* (2019.01)

(52) U.S. Cl.
CPC .............. *G06N 5/04* (2013.01); *G06F 16/29* (2019.01); *G06N 20/00* (2019.01)

(58) Field of Classification Search
CPC ........... G06N 5/04; G06N 20/00; G06F 16/29
See application file for complete search history.

(56) References Cited

U.S. PATENT DOCUMENTS

| | | | | |
|---|---|---|---|---|
| 8,595,050 B2 * | 11/2013 | Scotto | ................... | G06Q 50/12 705/7.29 |
| 8,880,420 B2 | 11/2014 | Scotto | | |
| 9,898,788 B1 * | 2/2018 | Calargun | ............... | G06N 20/00 |
| 2013/0166347 A1 | 6/2013 | Scotto et al. | | |
| 2014/0032358 A1 * | 1/2014 | Perkowitz | ............... | H04W 4/21 705/26.7 |
| 2015/0025983 A1 * | 1/2015 | Cicerchi | .............. | G06Q 20/047 705/15 |
| 2017/0186025 A1 | 6/2017 | Scotto et al. | | |
| 2019/0163710 A1 * | 5/2019 | Haghighat Kashani | ..................... | G06N 20/00 |
| 2019/0340537 A1 * | 11/2019 | Fung | ....................... | G06F 17/18 |

OTHER PUBLICATIONS

Vinay Bettadapura, "Leveraging Context to Support Automated Food Recognition in Restaurants", IEEE, 2015 (Year: 2015).*

* cited by examiner

*Primary Examiner* — Ann J Lo
*Assistant Examiner* — Van C Mang
(74) *Attorney, Agent, or Firm* — Caldwell Intellectual Property Law

(57) ABSTRACT

A method of determining a second alimentary provider is disclosed. The method inputs an order for an alimentary combination from a user. The alimentary combination is prepared by a first alimentary provider. The method classifies a plurality of alimentary providers. The method computes a alimentary provider score for a plurality of second alimentary combinations prepared by the plurality of alimentary providers as a function of a first machine-learning process, the machine learning process trained by training data correlating alimentary provider scores to alimentary combinations. The method selects a second alimentary provider from the plurality of alimentary providers as a function of the alimentary provider score. The method outputs the second alimentary provider to the user. A system of determining a second alimentary provider is also disclosed.

20 Claims, 5 Drawing Sheets

METHOD AND SYSTEM FOR DATA CLASSIFICATION TO GENERATE A SECOND ALIMENTARY PROVIDER

FIELD OF THE INVENTION

The present invention generally relates to the field of machine-learning. In particular, the present invention is directed to a method and system for data classification to generate a second alimentary provider.

BACKGROUND

Data management using artificial intelligence and machine-learning solutions help to optimize data management and processes which helps to reduce human error. Selection of a restaurant is one area where the classification of data may be important.

SUMMARY OF THE DISCLOSURE

In an aspect, a method of data classification to generate a second alimentary provider is disclosed. The method inputs an order for an alimentary combination from a user. The alimentary combination is prepared by a first alimentary provider. The method classifies the plurality of alimentary providers by receiving alimentary provider training data. The method classifies the plurality of alimentary providers by training an alimentary provider classifier as a function of the alimentary provider training data and determining the plurality of alimentary providers as a function of the alimentary provider classifier and the request for the alimentary combination. The method computes an alimentary combination score for a plurality of second alimentary combinations prepared by a plurality of alimentary providers as a function of a first machine-learning process, the machine learning process trained by training data correlating alimentary provider score to alimentary combinations. The method selects a second alimentary provider from the plurality of alimentary providers as a function of the alimentary provider score. The method outputs the second alimentary provider to the user.

In another aspect, a system to classify data to generate a second alimentary provider is disclosed. The system includes a computing device configured to input an order for an alimentary combination. The alimentary combination is prepared by a first alimentary provider. Computing device generates a plurality of alimentary providers to classify the plurality of alimentary providers, computing device is configured to receive alimentary provider training data. To classify the plurality of alimentary providers, computing device is configured to train an alimentary provider classifier as a function of the alimentary provider training data and identifying the plurality of alimentary providers as a function of the alimentary provider classifier and the request for the alimentary combination. Computing device computes an alimentary provider for a plurality of second alimentary combinations prepared by the plurality of alimentary providers as a function of a first machine-learning process, the machine learning process trained by training data correlating alimentary provider to alimentary combinations. Computing device selects a second alimentary provider from the plurality of alimentary providers as a function of the alimentary provider score. Computing device outputs the second alimentary provider to the user.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to a method and system for outputting a secondary alimentary provider when an alimentary combination requested from a first alimentary provider is not available. A machine-learning process is used to calculate an alimentary provider score used in the determination of a second alimentary provider. A second alimentary provider may be selected from a plurality of alimentary providers. The selected second alimentary provider is presented to the user where the user can either accept or decline the selection. If accepted, an identification of requested alimentary combination may be sent to second alimentary provider; if it is declined, the user may be offered another selection for a second alimentary provider. As a result, user may place an order for an alimentary combination of even if the alimentary combination is not available at the first alimentary provider. User may reject a choice of an alimentary provider in favor of a choice that may meet their approval and place an order for an alimentary combination with the chosen alimentary provider.

Figure 1:
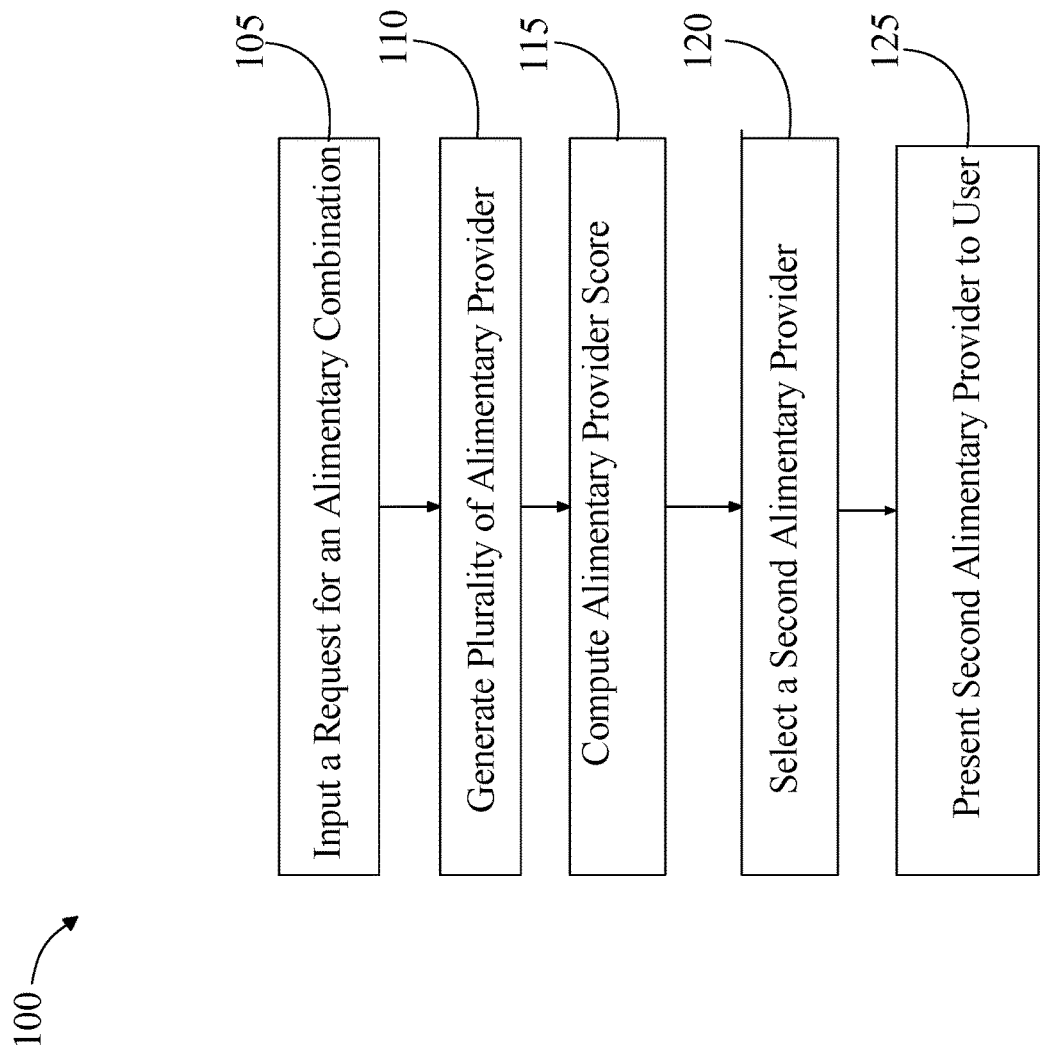
FIG. 1 is a flow diagram illustrating an exemplary embodiment of a method of determining a second alimentary provider.

Referring now to FIG. 1, an exemplary embodiment of a method 100 of selecting an alimentary provider is illustrated.

Still referring to FIG. 1, at step 105, computing device may input a request for an alimentary combination from a user. The alimentary combination is prepared by a first alimentary provider. As defined in this disclosure, an "alimentary combination" is a combination of ingredients representing any food group that, when combined and prepared, result in a final dish that may be ordered and delivered to the user. As used in this disclosure, "alimentary providers" are entities that prepare alimentary combinations. As a non-limiting example, alimentary providers may prepare alimentary combinations at a restaurant. Other such alimentary providers may include any combination of one or more of the following: restaurants, bars, cafes, or other vendor of food or beverages, such as a hotel. First alimentary provider may include a first location that a user chooses to request their alimentary combination. User may elect to order an alimentary combination by using an app on a mobile device or other computing device. User may elect to order an alimentary combination using an alimentary provider's website. As an example, user may elect to order an alimentary combination, such as but not limited to a pizza from their favorite alimentary provider, such as but not limited to a pizza restaurant. User may proceed to request pizza from pizza restaurant by placing an order. User's favorite restaurant may prepare a pizza. User may choose to have pizza delivered to a location. Alternatively, user may choose to pick up pizza in person.

Alternatively or additionally, and still referring to FIG. 1, computing device may determine that requested alimentary combination is not available at first alimentary provider. "Not available" may include, for example, requesting an alimentary combination from an alimentary provider outside the alimentary provider's business hours. First alimentary provider may be closed due to a pre-determined calendar event such as, but not limited to a vacation, a religious holiday, or the like. Even if first alimentary provider is available, requested alimentary combination from the first alimentary provider may not be available. Requested alimentary combination may not be available at first alimentary provider, for example, as the requested alimentary combination may be sold out. Another non-limiting example may be unavailability of ingredients to prepare the requested alimentary combination. Alimentary combination at first alimentary provider may have been taken off a menu of first alimentary provider without any updates to the menu with the user having no knowledge of this information.

Still referring to FIG. 1, at step 110, computing device may classify a plurality of alimentary providers. This may be accomplished using a classification process. Computing device may receive alimentary provider training data. Computer device may train an alimentary provider classifier as a function of the alimentary provider training data. Computing device and/or another device may generate an alimentary provider classifier using a classification algorithm defined as a process whereby a computing device derives a classifier from training data. As defined in this disclosure, a classifier utilizes training data to understand how given input variables relate to a class. As an example, a "classifier" may be used to classify alimentary combinations as vegetarian or not vegetarian. The classifier uses training data that includes alimentary combinations known to be vegetarian and alimentary combinations that are not vegetarian. Once the system is trained, a classifier is able to classify an unknown alimentary combination as vegetarian or not vegetarian. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers.

With continued reference to FIG. 1, training data, as used in this disclosure, training data is data containing correlations that a machine-learning process may use to model relationships between two or more categories of data elements. Training data will be discussed later in the disclosure.

Still referring to FIG. 1, generating a plurality of alimentary providers includes identifying the plurality of alimentary providers as a function of the alimentary provider classifier and the request for the alimentary combination. Alimentary provider training data, defined as training data used to generate alimentary provider classifier, may include, without limitation, a plurality of data entries, each data entry including one or more elements of alimentary providers and one or more correlated alimentary combinations, where the plurality of alimentary providers serving the requested alimentary combination may be identified.

Alternatively or additionally, and still referring to FIG. 1, generating a plurality of alimentary providers may include filtering the plurality of alimentary providers as a function of the type of cuisine. A non-limiting example of a type of cuisine include, but are not limited to, African, Argentinian, barbecue, bagels, Cajun, Cantonese, Caribbean, Chicken, Brazilian, Colombian, Cuban, deli, dessert, Dim Sum, eclectic, Ecuadorian, fine dining, French, fresh fruits, fusion, German, Greek, grill, hoagies, ice cream, Indian, Irish, Jamaican, Japanese, kids menu, Korean, late night, Latin American, Lebanese, Malaysian, Mandarin, Mediterranean, Mexican, Mexican-American, Middle Eastern, noodles, organic, Persian, Peruvian, Polish, Portuguese, Puerto Rican, ribs, Russian, seafood, soul food, soup, South American, Spanish, steak, subs, sushi, Szechwan, tapas, Tex-Mex, Thai, Turkish, vegan, vegetarian, Vietnamese, wings, and the like. Cuisine type may include restricted medical diets such as low sodium, gluten free, diabetic meal, liquid diet, low carb, low fat, low sodium, or the like. Types of cuisine may also include foods associated with a particular dieting method such as, but not limited to, Paleo Diet®, the Atkins Nutritional Approach™, and the like. Alimentary providers may serve a plurality of types of cuisine. In an embodiment, the plurality of alimentary providers serves an identical cuisine type as the first alimentary provider. As a non-limiting example, the first alimentary provider may serve Tex-Mex food. As a result, the plurality of alimentary providers may be filtered by those alimentary providers serving Tex-Mex food. In another example, the first alimentary provider may serve Middle Eastern and Greek food. As a result, the plurality of alimentary providers may serve Middle Eastern and Greek food.

Alternatively or additionally, and still referring to FIG. 1, generating a plurality of alimentary providers may include filtering the plurality of alimentary providers as a function of the user preferences. For example, the user may prefer to have an alimentary combination delivered with extra condiments. Other non-limiting examples of user preferences may include to have an alimentary combination that includes bread to have that bread toasted; increase the level of spiciness of a dish, and the like. User preferences may include, but not limited to restrictions in the type of dishes such as, but not limited dishes that are vegan, kosher, halal, or the like. User preferences may include having an alimentary combination delivered at a certain time of the day. The user may prefer to schedule a delivery of an alimentary combination for a particular time of the day. A user's selection of a delivery time may not coincide with the hours of operation of alimentary providers included in the plurality of alimentary providers.

Still referring to FIG. 1, at step 115, computing device may compute a alimentary provider score for a plurality of alimentary combinations prepared by the plurality of alimentary providers as a function of a first machine-learning process. The machine learning process may be trained by training data correlating alimentary provider scores to alimentary combinations. As defined in this disclosure, a "alimentary provider score" is a numerical scoring system that may be used to rank alimentary combinations based on the nutritional value provided by the alimentary combination. The alimentary provider score may be based on intake of various food groups and ingredients. As an example, the use of healthier foods and ingredients may have a higher alimentary provider score that an alimentary combination that includes, for example, mostly processed foods. As a non-limiting example, an alimentary combination that includes fruits and vegetable may have a higher alimentary provider score than a user that consumes primarily high fat foods. Consumption of alimentary combinations with high alimentary provider scores may be an indication that the user may be consuming healthier alimentary combinations. As a result, alimentary provider scores may predict the user's likelihood of disease.

Figure 2:
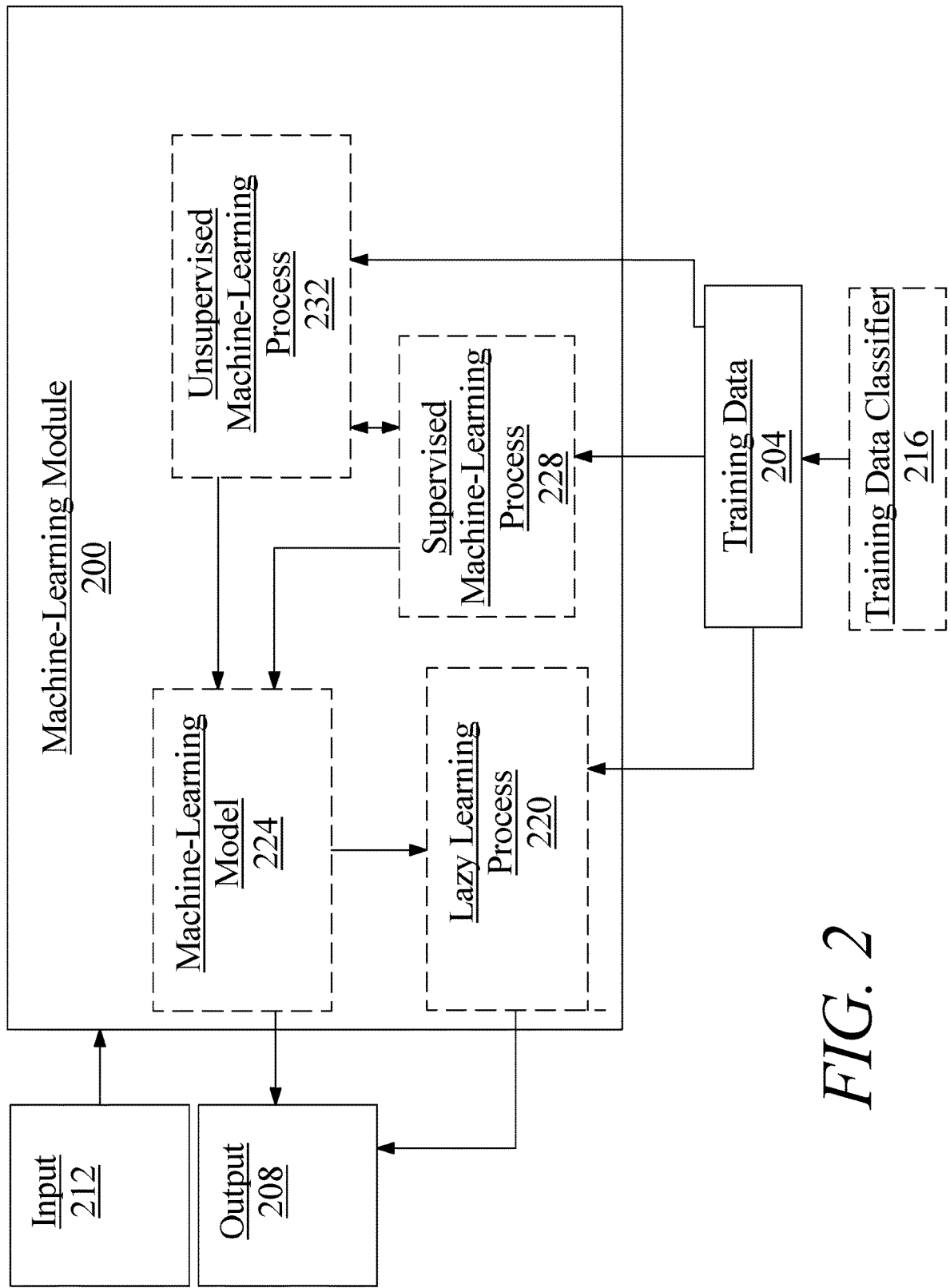
FIG. 2 is a block diagram of an exemplary embodiment of a machine-learning module.

Referring now to FIG. 2, an exemplary embodiment of a machine-learning module 200 that may perform one or more machine-learning processes as described in this disclosure is illustrated. Machine-learning module may include any suitable machine-learning module may perform determinations, classification, and/or analysis steps, methods, processes, or the like as described in this disclosure using machine learning processes. A "machine learning process," as used in this disclosure, is a process that automatedly uses training data 204 to generate an algorithm that will be performed by a computing device/module to produce outputs 208 given data provided as inputs 212; this is in contrast to a non-machine learning software program where the commands to be executed are determined in advance by a user and written in a programming language.

Still referring to FIG. 2, "training data," as used herein, is data containing correlations that a machine-learning process may use to model relationships between two or more categories of data elements. For instance, and without limitation, training data 204 may include a plurality of data entries, each entry representing a set of data elements that were recorded, received, and/or generated together; data elements may be correlated by shared existence in a given data entry, by proximity in a given data entry, or the like. Multiple data entries in training data 204 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 204 according to various correlations; correlations may indicate causative and/or predictive links between categories of data elements, which may be modeled as relationships such as mathematical relationships by machine-learning processes as described in further detail below. Training data 204 may be formatted and/or organized by categories of data elements, for instance by associating data elements with one or more descriptors corresponding to categories of data elements. As a non-limiting example, training data 204 may include data entered in standardized forms by persons or processes, such that entry of a given data element in a given field in a form may be mapped to one or more descriptors of categories. Elements in training data 204 may be linked to descriptors of categories by tags, tokens, or other data elements; for instance, and without limitation, training data 204 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 2, training data 204 may include one or more elements that are not categorized; that is, training data 204 may not be formatted or contain descriptors for some elements of data. Machine-learning algorithms and/or other processes may sort training data 204 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 204 to be made applicable for two or more distinct machine-learning algorithms as described in further detail below. Training data 204 used by machine-learning module 200 may correlate any input data as described in this disclosure to any output data as described in this disclosure. As a non-limiting illustrative example, the machine learning model may receive a plurality of alimentary combinations and outputs a alimentary provider score as a function of the alimentary combination.

Further referring to FIG. 2, training data may be filtered, sorted, and/or selected using one or more supervised and/or unsupervised machine-learning processes and/or models as described in further detail below; such models may include without limitation a training data classifier 216. Training data classifier 216 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module 200 may generate a classifier using a classification algorithm, defined as a process whereby a computing device and/or any module and/or component operating thereon derives a classifier from training data 204. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 216 such as, but not limited to alimentary provider training data may classify elements of alimentary providers to alimentary combinations.

Still referring to FIG. 2, machine-learning module 200 may be configured to perform a lazy-learning process 220 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 204. Heuristic may include selecting some number of highest-ranking associations and/or training data 204 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 2, machine-learning processes as described in this disclosure may be used to generate machine-learning model 224. A "machine-learning model," as used in this disclosure, is a mathematical and/or algorithmic representation of a relationship between inputs and outputs, as generated using any machine-learning process including without limitation any process as described above, and stored in memory; an input is submitted to a machine-learning model 224 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 224 may be generated by creating an artificial neural network, such as a convolutional neural network comprising an input layer of nodes, one or more intermediate layers, and an output layer of nodes. Connections between nodes may be created via the process of "training" the network, in which elements from a training data 204 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 2, machine-learning algorithms may include at least a supervised machine-learning process 228. At least a supervised machine-learning process 228, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include human subject descriptive data as described above as inputs, a pathogen identities as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 204. Persons skilled in the art, upon reviewing the entirety of this disclosure, will be aware of various possible variations of at least a supervised machine-learning process 228 that may be used to determine relation between inputs and outputs. Supervised machine-learning processes may include classification algorithms as defined above.

Further referring to FIG. 2, machine learning processes may include at least an unsupervised machine-learning processes 232. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 2, machine-learning module 200 may be designed and configured to create a machine-learning model 224 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 2, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

Still referring to FIG. 2, models may be generated using alternative or additional artificial intelligence methods, including without limitation by creating an artificial neural network, such as a convolutional neural network comprising an input layer of nodes, one or more intermediate layers, and an output layer of nodes. Connections between nodes may be created via the process of "training" the network, in which elements from a training data set 204 are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. This network may be trained using training data 204.

Referring again to FIG. 1, at step 120, computing device may select a second alimentary provider from the plurality of alimentary providers as a function of the alimentary provider score. As an example, a user with diabetes may receive a plurality of alimentary providers that serve alimentary combinations suitable for the alimentary provider score computed for the diabetic user. Computing device may provide the user with a plurality of alimentary providers based on a range of alimentary provider scores. As an example, the user may input a range of alimentary provider scores that may be used to provide the user with a suitable second alimentary providers.

Alternatively or additionally, with reference to FIG. 1, computing device may select a second alimentary combination by training an alimentary combination classifier as a function of second alimentary combination training data. Training data may be used to train an alimentary combination classifier which correlates alimentary combinations with suitable replacements for the alimentary combinations. Using a classification algorithm, alimentary combination classifier receives input from the computing device that includes requested alimentary combination and it outputs a suitable replacement for the requested alimentary combination. For instance, and without limitation, classification algorithm may include a K-nearest neighbors classification algorithm. Computing device may generate, using a feature learning algorithm, the plurality of alimentary combinations; the feature learning algorithm 128 may include a k-means clustering algorithm.

Alternatively or additionally, with reference to FIG. 1. computing device may select a second alimentary provider by receiving a geographical parameter of the first alimentary provider and receiving geographical parameter training data. Training data may be used to train a geographical parameter classifier as a function of the geographical parameter training data. Computer device may identify a second alimentary provider as a function of the geographical parameter training data and the first alimentary provider. As defined in this disclosure, a "geographical parameter" is a parameter that may give geographical information about an alimentary provider. As a non-limiting example, a geographical parameter would be a physical address of first alimentary provider. Other geographical parameters may include, but not limited to, shortest distance from the first alimentary provider to, for example a second alimentary provider; location coordinates from a Global Positioning Satellite ("GPS"); a postal code, and the like. The geographical parameters of the first alimentary provider may be used to train a geographical parameter classifier. Geographical parameter training data may correlate geographical parameters with alimentary providers. As an example, geographical parameter training data may correlate the zip code with alimentary providers. Using a classification algorithm, geographical parameter classifier receives input from computing device that includes, for example, the zip code of a first alimentary provider and outputs a second alimentary provider that may have the same zip code.

Still referring to FIG. 1, computing device may output the second alimentary provider to the user. Outputting the second alimentary provider to the user may include a text message using a text messaging protocol. Text messaging may include instant messaging protocol, such as, but not limited to Bitmessage, Bonjour, Matrix, short message service (SMS), or the like. Text messages can be classified in different categories depending on the subject of the message by processing the messages using, for example, natural language processing. Text messages and/or textual communication may include, without limitation, messages displayed and/or received using audio input and/or output devices, including using text-to-speech and/or speech-to-text technology. Presenting the second alimentary provider to the user may include an image file of the second alimentary provider. Image file formats include, but not limited to, Joint Photographic Experts Group (JPEG), Portable Network Graphics (PNG), Graphics Interchange Format (GIF), Tagged Image File (TIF), Portable Document Format (PDF), Encapsulated Postscript (EPS), Raw Image Files (RAW), or the like. A user may capture an image using a device using a computing device. Devices may include, without limitation a mobile camera, a scanner, a digital camera, a tablet computer, or the like. Presenting the second alimentary provider to the user may include a web link containing the universal resource locator ("URL") address to the second alimentary provider. In an embodiment, computing device may receive a transmission from the user confirming the selection of the alimentary provider. Computing device may transmit the request for the requested alimentary combination to the second alimentary provider. As an example, user may receive a message in, for example, a mobile device indicating to the user that their first alimentary provider is not available. User will receive a second alimentary provider as a selection to fulfill the requested alimentary combination. User may have the opportunity to accept or decline the selection of the second alimentary provider. User may accept the selection where second alimentary provider receives the order for the requested alimentary combination.

Additionally or alternatively, and with continued reference to FIG. 1, computing device may reject the selection of the second alimentary provider. Computer device may transmit a second selection of the second alimentary provider to the user. As an example, user may receive a message in, for example, a mobile device indicating to the user that their first alimentary provider is not available. User may receive a second alimentary provider as a selection to fulfill the requested alimentary combination. User may have the opportunity to accept or decline the selection of the second alimentary provider. User may decline the selection where second alimentary provider receives the order for the requested alimentary combination. Computing device may transmit to user a second selection of the second alimentary provider to the user. Alternatively, the user may be given the choice to cancel the request for an alimentary combination if the user is not presented with a second selection of the second alimentary provider that meets the approval of the user.

With continued reference to FIG. 1, computing device may determine a projected delivery time for the second alimentary combination from the second alimentary provider. A second machine-learning process may be trained using training data, the training data correlating past delivery times data with delivery parameters. Past delivery time data may include, for example, past delivery times made to a plurality of user's location from the second alimentary provider. A "delivery parameter" as used in this disclosure are parameters that may affect delivery times. Delivery parameters may include traffic conditions, weather conditions, and the like. The effect of delivery parameters in delivery times may be determined, without limitation, as disclosed in application Ser. No. 16/890,339 filed on Jun. 2, 2020, and entitled, "METHODS AND SYSTEMS FOR PATH SELECTION USING VEHICLE ROUTE GUIDANCE," and application no. Ser. No. 16/919,573, filed on Jul. 2, 2020, and entitled "A METHOD AND SYSTEM FOR SELECTION OF A PATH DELIVERIES," both applications are incorporated by reference herein in their entirety.

Computing device may receive at least a delivery parameter. Projected delivery times may be computed as a function of the at least delivery parameter using a second machine-learning process. As an example, second machine-learning process may receive a user's location and at least a delivery parameter as an input and outputs a projected delivery time.

Figure 3:
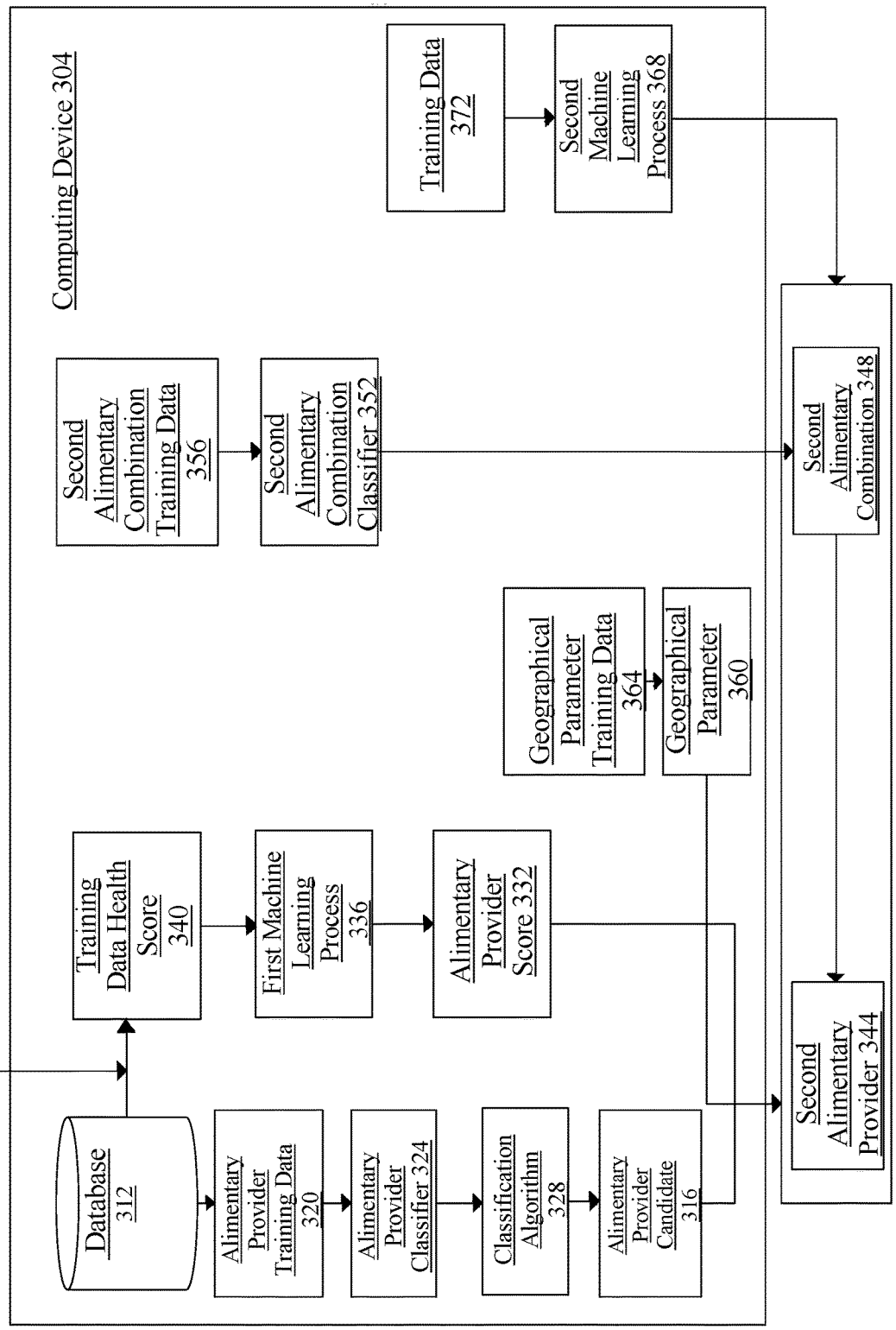
FIG. 3 is a block diagram of an exemplary embodiment of an system of determining a second alimentary combination.

Referring now to FIG. 3, an exemplary embodiment of a system 300 for a system for determining a second alimentary provider is disclosed. System 300 may include computing device 304 configured to input an alimentary combination from a user. The alimentary combination is prepared by a first alimentary provider 308.

With continued reference to FIG. 3, computing device 304 may include any computing device as described in this disclosure, including without limitation a microcontroller, microprocessor, digital signal processor (DSP) and/or system on a chip (SoC) as described in this disclosure. Computing device 304 may include, be included in, and/or communicate with a mobile device such as a mobile telephone or smartphone. Computing device 304 may include a single computing device 304 operating independently, or may include two or more computing device 304 operating in concert, in parallel, sequentially or the like; two or more computing device 304 may be included together in a single computing device 304 or in two or more computing device 304. Computing device 304 may interface or communicate with one or more additional devices as described below in further detail via a network interface device. Network interface device may be utilized for connecting computing device 304 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing device, and any combinations thereof. A network may employ a wired and/or a wireless mode of communication. In general, any network topology may be used. Information (e.g., data, software etc.) may be communicated to and/or from a computer and/or a server. Computing device 304 may include but is not limited to, for example, a server or cluster of computing devices in a first location and a second computing device or cluster of computing devices in a second location. Computing device 304 may include one or more computing devices dedicated to data storage, security, deliveries of traffic for load balancing, and the like. Computing device 304 may distribute one or more computing tasks as described below across a plurality of computing devices of computing device 304, which may operate in parallel, in series, redundantly, or in any other manner used for deliveries of tasks or memory between computing devices. Computing device 304 may be implemented using a "shared nothing" architecture in which data is cached at the worker, in an embodiment, this may enable scalability of system 300 and/or computing device 304.

Continuing to refer to FIG. 3, computing device 304 and/or any module thereof may be designed and/or configured to perform any method, method step, or sequence of method steps in any embodiment described in this disclosure, in any order and with any degree of repetition. Furthermore, modules as described in this disclosure are provided for exemplary purposes to provide the functional and structural processes and/or configurations that may be used to perform processes and instantiated, whether in the form of hardware circuitry, process-based software code, machine-language, object oriented language, or programming or any other implementation that any person skill in the art, having the benefit of this disclosure may use to implement process and/or configuration as described herein; modules as described in this disclosure need not be implemented as separate modules. For instance, computing device 304 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Computing device 304 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Still referring to FIG. 3, computing device 304 may connect to and/or include a database 312. Database 312 may be implemented, without limitation, as a relational database 312, a key-value retrieval database 312 such as a NOSQL database 312, or any other format or structure for use as a database 312 that a person skilled in the art would recognize as suitable upon review of the entirety of this disclosure. Database 312 may alternatively or additionally be implemented using a distributed data storage protocol and/or data structure, such as a distributed hash table or the like. Database 312 may include a plurality of data entries and/or records as described above. Data entries in a database 312 may be flagged with or linked to one or more additional elements of information, which may be reflected in data entry cells and/or in linked tables such as tables related by one or more indices in a relational database 312. Persons skilled in the art, upon reviewing the entirety of this disclosure, will be aware of various ways in which data entries in a database 312 may store, retrieve, organize, and/or reflect data and/or records as used herein, as well as categories and/or populations of data consistently with this disclosure. In some embodiments, network data, or other information such as user information, courier information, and alimentary provider information, may be stored in and/or retrieved from database 312.

Figure 4:
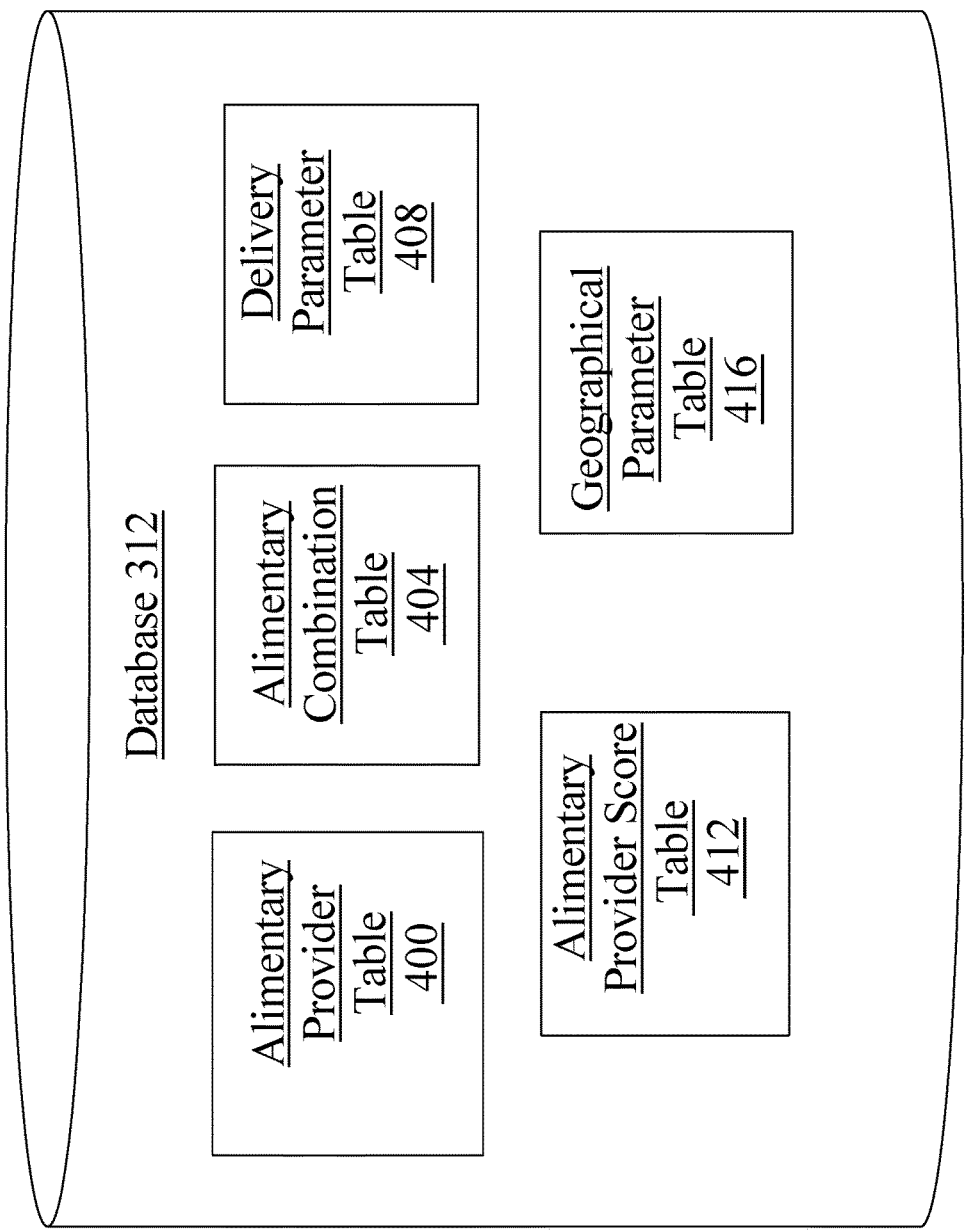
FIG. 4 is a block diagram of an exemplary embodiment of a database.

Referring now to FIG. 4 an exemplary embodiment of a database 312 is illustrated. Database 312 may, as a non-limiting example, organize data stored in the database according to one or more database tables. One or more database tables may be linked to one another by, for instance, common column values. For instance, a common column between two tables of database 312 may include an identifier of a first alimentary provider, for instance as defined below; as a result, a query may be able to retrieve all rows from any table pertaining to a given first alimentary provider. Other columns may include any other category usable for organization or subdivision of data, including types of data, common pathways between, for example, an alimentary combination and a first alimentary provider, or the like; persons skilled in the art, upon reviewing the entirety of this disclosure, will be aware of various ways in which expert data from one or more tables may be linked and/or related to expert data in one or more other tables.

Still referring to FIG. 4, one or more database tables in database 312 may include, as a non-limiting example, an alimentary provider table 400, which may be used to store records and attributes related to alimentary providers. This may include, but not limited to, names of alimentary providers, type of cuisine, or the like. As another non-limiting example, one or more tables in database 312 may include alimentary combination table 404 which may be used to store attributes of alimentary combinations such as, but not limited to, time of preparation, allowed ingredient substitutions, or the like. As another non-limiting example, one or more tables in database 312 may include a delivery parameter table 408. A delivery parameter table 408 may include, but not limited to delivery routes and suggested alternates as a function of delivery parameters such as traffic conditions, weather conditions, or the like. As another non-limiting example, one or more tables in database 312 may include an alimentary provider score table 412. A results table 412 may include alimentary provider scores based on pre-existing conditions such as hypertension or diabetes, alimentary provider scores based on level of activity, alimentary provider scores based on a user's lifestyle, or the like. As another non-limiting example, one or more tables in database 312 may include an geographical parameter table 416. A geographical parameter table 416 may include, but not limited to, geographical parameters of alimentary providers which include, but are not limited to, physical address of the alimentary provider, GPS coordinates, or the like.

Referring again to FIG. 3, computing device 304 may determine that the requested alimentary combination is not available at the first alimentary provider 308. This may be implemented, without limitation, as described above in FIGS. 1-4.

Still referring to FIG. 3, computing device 304 may classify a plurality of alimentary providers 316. Computing device may receive alimentary provider training data 320. Computer device 304 may train alimentary provider classifier 324 as a function of the alimentary provider training data 320. Computing device 304 may generate alimentary provider classifier 324 using a classification algorithm 328 defined as a process whereby a computing device 304 derives a classifier from training data 320. This may be implemented, without limitation, as described in FIGS. 1-4.

With continued reference to FIG. 3, computing device 304 may classify a plurality of alimentary providers 316 which may include identifying the plurality of alimentary providers 316 as a function of the alimentary provider classifier 324 and the request for the alimentary combination. This may be implemented, without limitation, as described above in FIGS. 1-4.

Alternatively or additionally, and with continued reference to FIG. 3, computing device 304 may be configured to classify a plurality of alimentary providers 316 by filtering the plurality of alimentary providers 316 as a function of the type of cuisine. This may be implemented, without limitation, as described above in FIGS. 1-4.

Alternatively or additionally, and still referring to FIG. 3, computing device 304 may classify a plurality of alimentary providers 316 by filtering the plurality of alimentary providers as a function of the user preferences. This may be implemented, without limitation, as described above in FIGS. 1-4.

Still referring to FIG. 3, computing device 304 may compute an alimentary provider score 332 for a plurality of alimentary combinations prepared by the plurality of alimentary providers as a function of a first machine-learning process 336. The machine learning process 336 may be trained by training data 340 correlating alimentary provider scores to alimentary combinations. This may be implemented, without limitation, as described above in FIGS. 1-4.

Referring back to FIG. 3, computing device 304 may select a second alimentary provider 344 from the plurality of alimentary providers as a function of the alimentary provider score 332. This may be implemented, without limitation, as described above in FIGS. 1-4.

Alternatively or additionally, with reference to FIG. 3, computing device 304 may select a second alimentary combination 348 by training an alimentary combination classifier 352 as a function of second alimentary combination training data 356. This may be implemented, without limitation, as described above in FIGS. 1-4.

Alternatively or additionally, with reference to FIG. 3. computing device 304 may select a second alimentary provider 344 by receiving a geographical parameter 360 of the first alimentary provider 308 and receiving geographical parameter training data 364. This may be implemented, without limitation, as described above in FIGS. 1-4.

Still referring to FIG. 3, computing device 304 may present the second alimentary provider to the user. This may be implemented, without limitation, as described above in FIGS. 1-4

Additionally or alternatively computing device 304 may receive a transmission from the user confirming the selection of the second alimentary provider 344. Computing device may transmit the request for the requested alimentary combination to the second alimentary provider. This may be implemented, without limitation, as described above in FIGS. 1-4

Additionally or alternatively, and with continued reference to FIG. 3, computing device may receive a transmission from the user rejecting the selection of the second alimentary provider. Computing device may transmit to user a second selection of the second alimentary provider to the user. This may be implemented, without limitation, as described above in FIGS. 1-4.

With continued reference to FIG. 3, computing device 304 may determine a projected delivery time for the second alimentary combination from the second alimentary provider 344. A second machine-learning process 368 may be trained using training data 372, the training data correlating past delivery times data with delivery parameters. This may be implemented, without limitation, as described above in FIGS. 1-4

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 5:
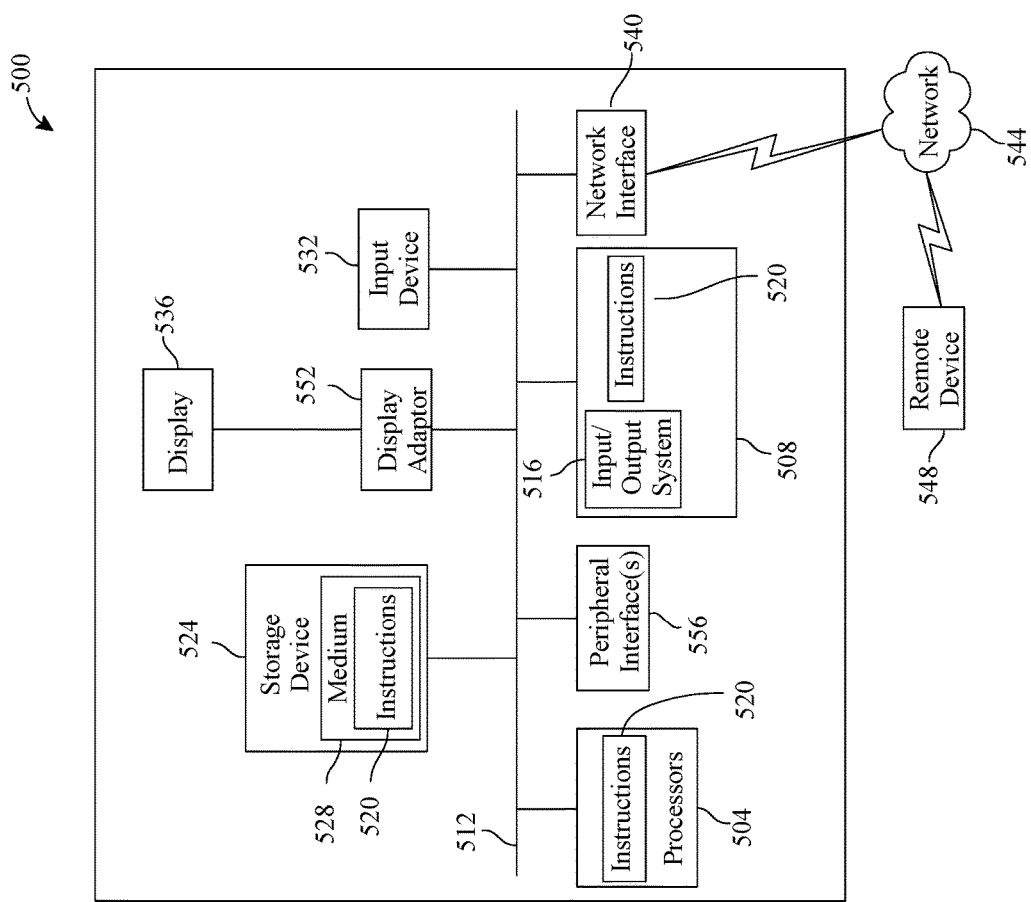
FIG. 5 is a block diagram of a computing system that can be used to implement any one or more of the methodologies disclosed herein and any one or more portions thereof.

FIG. 5 shows a diagrammatic representation of one embodiment of a computing device in the exemplary form of a computer system 500 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 500 includes a processor 504 and a memory 508 that communicate with each other, and with other components, via a bus 512. Bus 512 may include any of several types of bus structures including, but not limited to, a memory bus, a memory controller, a peripheral bus, a local bus, and any combinations thereof, using any of a variety of bus architectures.

Processor 504 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 504 may be organized according to Von Neumann and/or Harvard architecture as a non-limiting example. Processor 504 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC)

Memory 508 may include various components (e.g., machine-readable media) including, but not limited to, a random-access memory component, a read only component, and any combinations thereof. In one example, a basic input/output system 516 (BIOS), including basic routines that help to transfer information between elements within computer system 500, such as during start-up, may be stored in memory 508. Memory 508 may also include (e.g., stored on one or more machine-readable media) instructions (e.g., software) 520 embodying any one or more of the aspects and/or methodologies of the present disclosure. In another example, memory 508 may further include any number of program modules including, but not limited to, an operating system, one or more application programs, other program modules, program data, and any combinations thereof.

Computer system 500 may also include a storage device 524. Examples of a storage device (e.g., storage device 524)

include, but are not limited to, a hard disk drive, a magnetic disk drive, an optical disc drive in combination with an optical medium, a solid-state memory device, and any combinations thereof. Storage device 524 may be connected to bus 512 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 524 (or one or more components thereof) may be removably interfaced with computer system 500 (e.g., via an external port connector (not shown)). Particularly, storage device 524 and an associated machine-readable medium 528 may provide nonvolatile and/or volatile storage of machine-readable instructions, data structures, program modules, and/or other data for computer system 500. In one example, software 520 may reside, completely or partially, within machine-readable medium 528. In another example, software 520 may reside, completely or partially, within processor 504.

Computer system 500 may also include an input device 532. In one example, a user of computer system 500 may enter commands and/or other information into computer system 500 via input device 532. Examples of an input device 532 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 532 may be interfaced to bus 512 via any of a variety of interfaces (not shown) including, but not limited to, a serial interface, a parallel interface, a game port, a USB interface, a FIRE-WIRE interface, a direct interface to bus 512, and any combinations thereof. Input device 532 may include a touch screen interface that may be a part of or separate from display 536, discussed further below. Input device 532 may be utilized as a user selection device for selecting one or more graphical representations in a graphical interface as described above.

A user may also input commands and/or other information to computer system 500 via storage device 524 (e.g., a removable disk drive, a flash drive, etc.) and/or network interface device 540. A network interface device, such as network interface device 540, may be utilized for connecting computer system 500 to one or more of a variety of networks, such as network 544, and one or more remote devices 548 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 544, may employ a wired and/or a wireless mode of communication. In general, any network topology may be used. Information (e.g., data, software 520, etc.) may be communicated to and/or from computer system 500 via network interface device 540.

Computer system 500 may further include a video display adapter 552 for communicating a displayable image to a display device, such as display device 536. Examples of a display device include, but are not limited to, a liquid crystal display (LCD), a cathode ray tube (CRT), a plasma display, a light emitting diode (LED) display, and any combinations thereof. Display adapter 552 and display device 536 may be utilized in combination with processor 504 to provide graphical representations of aspects of the present disclosure. In addition to a display device, computer system 500 may include one or more other peripheral output devices including, but not limited to, an audio speaker, a printer, and any combinations thereof. Such peripheral output devices may be connected to bus 512 via a peripheral interface 556. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A method of data classification to generate a second alimentary provider, the method comprising:
   inputting, by a computing device, a request for an alimentary combination from a user,
      wherein the alimentary combination is prepared by a first alimentary provider;
   determining, by the computing device, the alimentary combination is not available at the first alimentary provider;
   classifying, by the computing device, a plurality of alimentary providers, wherein classifying further comprises:
      receiving alimentary provider training data, wherein the alimentary provider training data includes a plurality of data entries, each of the data entries including one or more elements of the each of the plurality of alimentary providers and one or more correlated alimentary combinations;
      training an alimentary provider classifier as a function of the alimentary provider training data; and
      outputting the plurality of alimentary providers as a function of the alimentary provider classifier and the request for the alimentary combination;
   determining, by the computing device, an alimentary provider score of a plurality of second alimentary combinations prepared by the plurality of alimentary providers as a function of a first machine-learning process, the machine learning process trained by training data correlating alimentary provider score to alimentary combinations, wherein each of the plurality of second alimentary combinations comprises a replacement for the alimentary combination prepared by the first alimentary provider;
selecting, by the computing device, a second alimentary provider from the plurality of alimentary providers as a function of the alimentary provider score; and
outputting, by the computing device, the second alimentary provider to the user.

2. The method of claim 1, wherein the plurality of alimentary providers serves an identical cuisine type as the first alimentary provider.

3. The method of claim 1, further comprising:
filtering the plurality of alimentary providers as a function of the type of cuisine.

4. The method of claim 1, further comprising:
filtering the plurality of alimentary providers as a function of the user preferences.

5. The method of claim 1, further comprising:
training an alimentary combination classifier as a function of second alimentary combination training data; and
identifying the second alimentary combination as a function of the alimentary combination classifier and the requested alimentary combination.

6. The method of claim 1, wherein selecting a second alimentary provider further comprises:
receiving a geographical parameter of the first alimentary provider;
receiving geographical parameter training data;
training a geographical parameter classifier as a function of geographical parameter training data; and
identifying a second alimentary provider as a function of geographical parameter training data and first alimentary provider.

7. The method of claim 1, further comprising:
determining that the alimentary combination is not available at the first alimentary provider.

8. The method of claim 1, wherein outputting the second alimentary provider to the user, further comprises:
confirming the selection of the alimentary provider by receiving a message from the user; and
transmitting the request for the requested alimentary combination to the second alimentary provider.

9. The method of claim 1, further comprising:
rejecting the selection of the alimentary provider by receiving a message from the user; and
transmitting a second selection of the second alimentary provider to the user.

10. The method of claim 1, further comprising:
determining a projected delivery time for the second alimentary combination from the second alimentary provider by:
training a second machine-learning process using training data correlating past delivery times data with delivery parameters;
receiving at least a delivery parameter; and
outputting the projected delivery time as a function at the at least delivery parameter using the second machine-learning process.

11. A system of outputting a second alimentary provider, the system comprising:
a computing device configured to:
input a request for an alimentary combination from a user, wherein the alimentary combination is prepared by a first alimentary provider;
determine the alimentary combination is not available at the first alimentary provider;
classify a plurality of alimentary providers, wherein classifying further comprises:
receiving alimentary provider training data, wherein the alimentary provider training data includes a plurality of data entries, each of the data entries including one or more elements of the each of the plurality of alimentary providers and one or more correlated alimentary combinations;
training an alimentary provider classifier as a function of the alimentary provider training data; and
outputting the plurality of alimentary providers as a function of the alimentary provider classifier and the request for the alimentary combination;
compute an alimentary provider score for a plurality of second alimentary combinations prepared by the plurality of alimentary providers as a function of a machine-learning process, the machine learning process trained by training data correlating alimentary provider score to alimentary combinations, wherein each of the plurality of second alimentary combinations comprises a replacement for the alimentary combination prepared by the first alimentary provider;
select a second alimentary provider from the plurality of alimentary providers as a function of the alimentary provider score; and
output the second alimentary provider to the user.

12. The system of claim 11, wherein the plurality of alimentary providers serves an identical cuisine type as the first alimentary provider.

13. The system of claim 11, wherein computing device is further configured to:
filter the plurality of alimentary providers as a function of the type of cuisine.

14. The system of claim 11, wherein computing device is further configured to:
filter the plurality of alimentary providers as a function of the user preferences.

15. The system of claim 11, wherein computing device configured to select a second alimentary combination is further configured to:
train an alimentary combination classifier as a function of second alimentary combination training data;
identify the second alimentary combination as a function of the alimentary combination classifier and the requested alimentary combination.

16. The system of claim 11, wherein computing device configured to select a second alimentary combination is further configured to:
receive a geographical parameter of the first alimentary provider;
receive geographical parameter training data;
train a geographical parameter classifier as a function of geographical parameter training data; and
identify a second alimentary provider as a function of geographical parameter training data and first alimentary provider.

17. The system of claim 11, wherein computing device is further configured to:
determine that the alimentary combination is not available at the first alimentary provider.

18. The system of claim 11, wherein the computing device configured to output the second alimentary provider to the user is further configured to:
confirm the selection of the alimentary provider by receiving a message from the user; and transmit the request for the requested alimentary combination to the second alimentary.

19. The system of claim 11, wherein computing device configured to output the second alimentary provider to the user is further configured to:
reject the selection of the alimentary provider by receiving a message from the user; and
transmit a second selection of the second alimentary provider to the user.

20. The system of claim 11, wherein the computing device is further configured to:
determine a projected delivery time for the second alimentary combination from the second alimentary provider by:
training a second machine-learning process using training data correlating distance from the second alimentary provider to the user;
receiving at least a delivery parameter; and
computing the projected delivery time as a function at the at least delivery parameter using the fourth machine-learning process.

\* \* \* \* \*